US 6,633,987 B2

(12) United States Patent
Jain et al.

(10) Patent No.: US 6,633,987 B2
(45) Date of Patent: *Oct. 14, 2003

(54) METHOD AND APPARATUS TO IMPLEMENT THE ACPI(ADVANCED CONFIGURATION AND POWER INTERFACE) C3 STATE IN A RDRAM BASED SYSTEM

(75) Inventors: Satchit Jain, San Jose, CA (US); Siripong Sritanyaratana, Union City, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/534,193

(22) Filed: Mar. 24, 2000

(65) Prior Publication Data

US 2003/0101361 A1 May 29, 2003

(51) Int. Cl.⁷ .................................................. G06F 1/30
(52) U.S. Cl. ........................................ 713/300; 713/322
(58) Field of Search ................................ 713/300, 320, 713/322

(56) References Cited

U.S. PATENT DOCUMENTS

| | | | | |
|---|---|---|---|---|
| 5,446,695 A | * | 8/1995 | Douse et al. | 365/222 |
| 5,703,823 A | * | 12/1997 | Douse et al. | 365/222 |
| 5,815,693 A | | 9/1998 | McDermott et al. | |
| 5,832,286 A | | 11/1998 | Yoshida | |
| 5,872,903 A | | 2/1999 | Iwata et al. | |
| 5,884,088 A | * | 3/1999 | Kardach et al. | 713/324 |
| 6,125,450 A | * | 9/2000 | Kardach | 713/323 |
| 6,128,746 A | * | 10/2000 | Clark et al. | 713/324 |
| 6,209,088 B1 | * | 3/2001 | Reneris | 713/1 |
| 6,230,274 B1 | * | 5/2001 | Stevens et al. | 713/320 |
| 6,357,013 B1 | * | 3/2002 | Kelly et al. | 713/324 |
| 6,378,081 B1 | * | 4/2002 | Hammond | 713/501 |
| 6,396,324 B1 | * | 5/2002 | Hsu et al. | 327/298 |
| 6,442,697 B1 | * | 8/2002 | Jain et al. | 713/300 |
| 6,442,698 B2 | * | 8/2002 | Nizar | 713/320 |
| 6,480,965 B1 | * | 11/2002 | Harriman et al. | 713/322 |
| 6,525,988 B2 | * | 2/2003 | Ryu et al. | 713/1 |

FOREIGN PATENT DOCUMENTS

| | | | |
|---|---|---|---|
| EP | 0 780 755 A1 | 6/1997 | |
| JP | 11213659 A | * 8/1999 | ......... G11C/11/406 |
| WO | WO 98/44405 | 10/1998 | |
| WO | WO 00/26753 | 5/2000 | |
| WO | WO 01/25886 A2 | 4/2001 | |
| WO | WO 01/33322 A2 | 5/2001 | |
| WO | PCT/US01/07254 | 6/2001 | |

* cited by examiner

Primary Examiner—Thomas Lee
Assistant Examiner—Eric Chang
(74) Attorney, Agent, or Firm—Libby H. Hope (57) ABSTRACT

A mechanism for conserving power consumption includes a processor, a memory, and a memory control hub ("MCH"). The memory is coupled to the processor and MCH is also coupled to the processor. MCH is further configured to switch between at least two power consumption modes for conserving power consumption.

29 Claims, 11 Drawing Sheets

METHOD AND APPARATUS TO IMPLEMENT THE ACPI(ADVANCED CONFIGURATION AND POWER INTERFACE) C3 STATE IN A RDRAM BASED SYSTEM

BACKGROUND OF THE INVENTION

1. Field of the Invention

The present invention relates generally to the field of computer systems. More specifically, the present invention relates to the conservation of power consumption in a computer system.

2. Description of the Related Art

As more systems become portable, increased reliance will necessarily be placed on portable power supplies, particularly batteries. Reducing power consumption by processors becomes increasingly important as the industry moves to maximize battery life. Even in stationary systems, excessive power consumption translates into higher operational costs. Additionally, increasingly stringent governmental requirements and environmental standards militate toward reducing the power consumed in a computer system where possible.

With increasing clock frequencies for each new processor generation, the power consumption for such processor goes up as the speed of the clock increases. Accordingly, when a processor consumes a large amount of power, the temperature of the processor increases. As the temperature of the processor increases, the reliability of the processor decreases. Furthermore, in order to optimize the output of a high performance processor, high performance co-processors such as memory control hub should also be employed. Consequently, a high performance system using fast processor typically consumes a large amount of power.

However, many word processor applications, for example, do not require the system to operate at full power because a typical word processor would not be able to use all the resources or power that a typical high performance processor provides. Accordingly, it is not necessary to keep a high performance system at full power because running at full power not only reduces the battery life time, but also effects overall system reliability.

"In the past, an approach of advanced configuration and power interface ("ACPI") has been used to reduce power consumption in a system. However, ACPI has never been applied in a system using RDRAM (Rambus™ Dynamic Random Access Memory) or similar DRAM (Dynamic Random Access Memory) based systems."

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and an apparatus for conserving system power consumption are described.

For purposes of explanation, in the following description numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise in the following discussions, it is appreciated that throughout the present invention discussions utilizing terms such as "processing" or "computing" or "calculating" or "determining" or "displaying" refer to the action and processes of a computer system, or similar electronic computing device. That is, a device that manipulates and transforms data represented as physical (electronic) quantities within the computer system's registers and memories into other data similarly represented as physical quantities within the computer system memories, or registers, or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

A method and apparatus for conserving power consumption using multiple power consumption states are disclosed. In one embodiment, a system having multiple Rambus™ Dynamic Random Access Memories ("RDRAMs") implements the Advanced Configuration and Power Interface ("ACPI") C3 state, also known as Deep Sleep state, for conserving power consumption. In this embodiment, various clock frequencies generated by a clock synthesizer are distributed to various components including central processor unit ("CPU") and RDRAMs for saving power consumption.

In an alternative embodiment, a system includes a processor, a memory, and a memory control hub ("MCH") where the memory and the MCH are coupled to the processor. In this embodiment, the MCH can switch between at least two power consumption states to optimize power consumption. In another embodiment, a processor can be shut down for conserving power consumption. For example, the clock synthesizer may suspend the CPU clock signals to shut down the processor.

Figure 1:
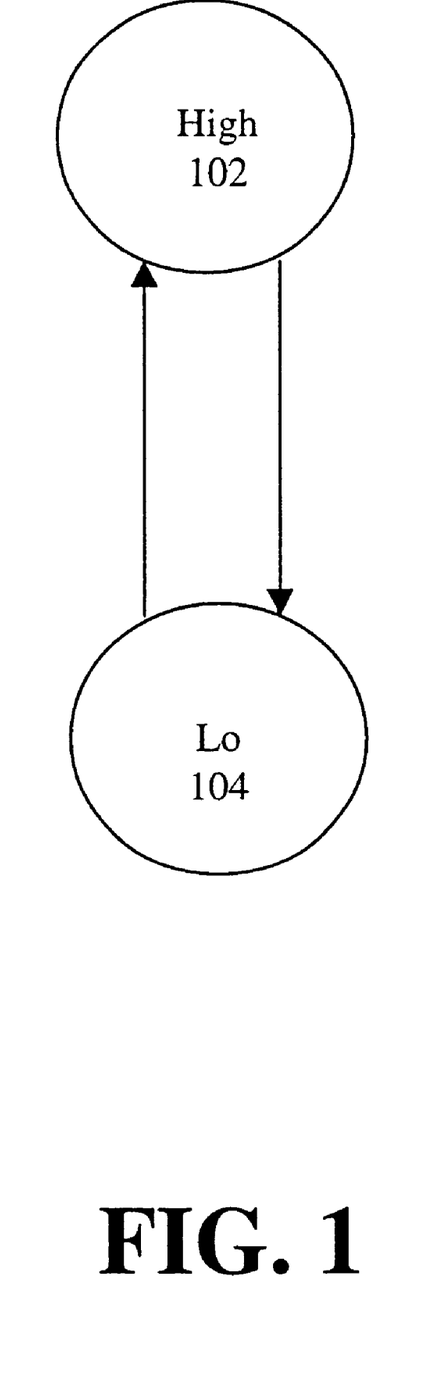
FIG. 1 is a state diagram illustrating one embodiment of power consumption states.

FIG. 1 is a state diagram 100 illustrating one embodiment of power consumption states. State diagram 100 contains a high power state 102 and a low power state 104. High power state 102 indicates high clock frequency and high operating voltage while low power state 104 indicates low clock frequency and low operating voltage. For example, high power state 102 may operate at 700 megahertz (MHz) with operating voltage at 1.8 volt (v) while low power state 104 operates at 400 MHz with operating voltage at 1.3v. To conserve power consumption, a system or a CPU may, in one embodiment, transit dynamically between high power state 102 and lower power state 104 according to the computing power required by the applications.

"In another embodiment, a system dynamically switches between high power state 102 and low power state 104 without user intervention. For example, multiple transitions between high power state 102 and low power state 104 may take place between keystrokes. During high power state 102, in one embodiment the CPU consumes full power and is able to perform full functions. However, during low power state 104, in one embodiment the CPU consumes lower power and is only able to perform some functions. Note that high power state 102 may consume double or triple the amount of power than low power state 104."

Power consumption can be calculated in terms of voltage and frequency. The mathematical equation for the power consumption is listed as follows.

$$P \propto CV^2 f$$

"where P represents power and C represents a constant. Also, V represents voltage, while f represents frequency. For example, if high power state 102 operates at 700 MHz with 1.8v, the power consumption for high power state PH would be:"

$$P_H \propto CV^2 f = C \times (1.8)2 \times 700 = 2268C$$

If low power state 104 operates at 400 MHz with 1.3v, the power consumption for low power state $P_L$ would be $$P_L \propto CV^2 f = C \times (1.3)2 \times 400 = 676C$$

Thus, $P_H$ consumes more than three times the power that $P_L$ consumes.

Figure 2:
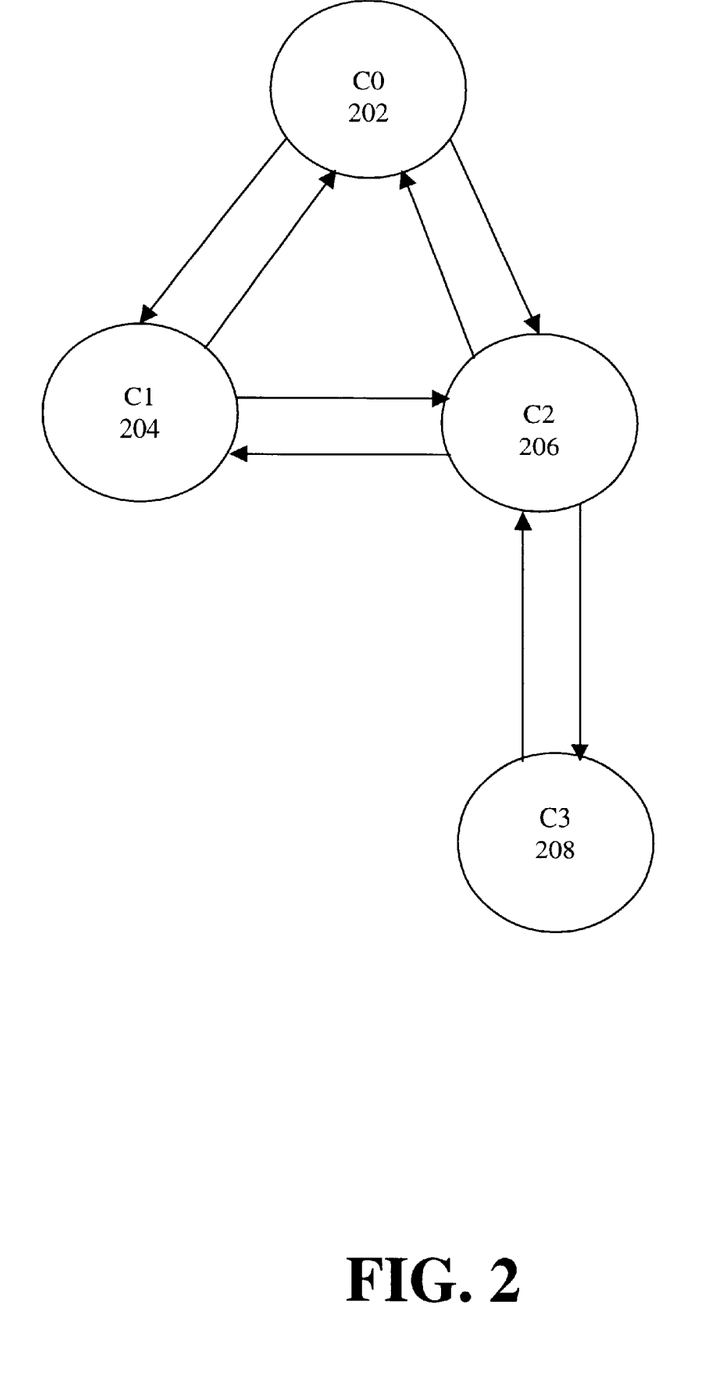
FIG. 2 is a state diagram illustrating one embodiment of power consumption states having four states.

FIG. 2 is a state diagram 200 illustrating one embodiment of power consumption states having four states. State diagram 200 contains C0 202, C1 204, C2 206, and C3 208 states. Additional states may be added but they are not important to understanding the present invention.

In one embodiment, C0 202 state is an active power consumption state where a CPU performs a full range of functions and consumes full power. During C0 202 state, power management for conserving power is not employed. In one embodiment, C1 204 state is an auto-halt power consumption state where the advanced-power management ("APM") for conserving power may be performed. A CPU running at C1 204 state commonly consumes less power than the CPU running at C0 202 state. For example, during C1 204 state, instructions are commonly not executed and the instruction cache is commonly empty.

In one embodiment, C2 206 state is a stop-grant power consumption state where less power is consumed in C2 206 state than in either C0 202 state or C1 204 state. For example, during C2 206 state, the clock signals for the CPU may be stopped. In another embodiment, the CPU is partially shut down. For example, the main portion of the CPU is shut down while the snoop portion of the CPU is still active for monitoring the front site bus.

In one embodiment, C3 208 state is known as deep sleep state where some components of a system, including the CPU, are shut down. In this embodiment, the CPU is completely shut down so that the clock frequency can be changed at C3 208 state. To enter C3 208 state, in one embodiment the CPU is configured to enter C2 206 state before entering C3 208 state. In an alternative embodiment, the CPU can switch directly from C0 202 state to C3 208 state.

Figure 3:
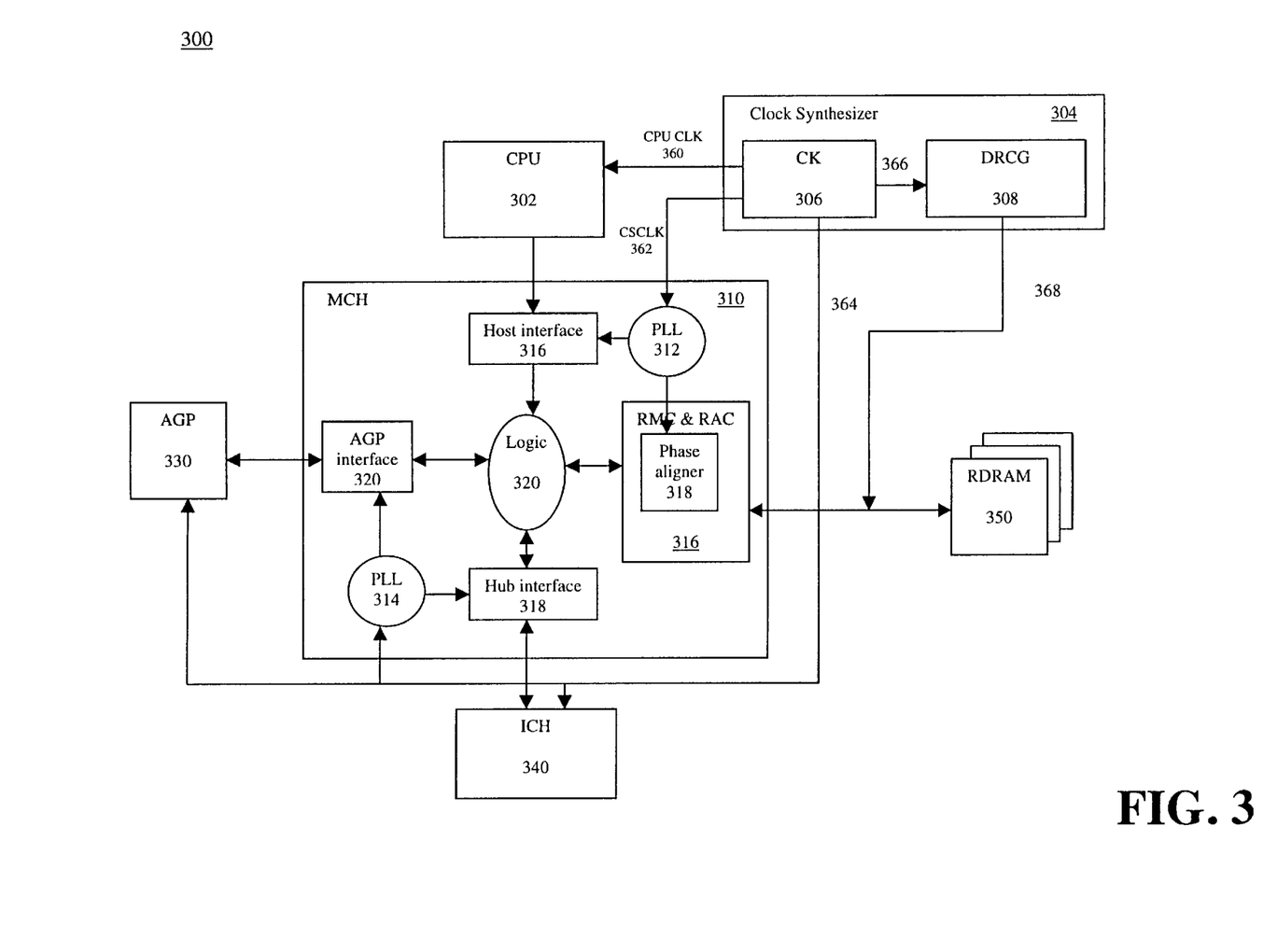
FIG. 3 is a block diagram illustrating one embodiment of a system having a RDRAM.

"FIG. 3 is a block diagram 300 illustrating one embodiment of a digital processing system having a RDRAM. Block diagram 300 includes a clock synthesizer 304, a CPU 302, a MCH 310, an advanced graphic processor ("AGP") 330, an ICH ("Input/Output Control Hub") 340, and at least one RDRAM 350. Clock synthesizer 304 further includes clock generator 306 and a direct Rambus™ clock generator ("DRCG") 308. MCH 310 also includes a host interface 316, an AGP interface 320, a hub interface 318, a logic block 320, two PLLs 312, 314, and a Rambus™ memory control ("RMC")/Rambus™ ASIC cell ("RAC") 316. RMC/RAC 316 or RMC 316 further includes a phase aligner 318. Other blocks could be added into block diagram 300, but they are not pertinent to understanding the disclosed system."

"In one embodiment, clock synthesizer 304 has two states, namely, an active state and a clock stop state. During the active state, clock synthesizer 304 distributes various clock signals to various components including RDRAM 350. However, during the clock stop state, clock synthesizer 304 suspends some clock signals for conserving power consumption. In another embodiment, clock synthesizer 304 contains two main components, namely, clock generator 306 and DRCG ("Direct Rambus™ Clock Generator") 308."

"In one embodiment, clock generator 306 is a clock oscillator that provides clock signal 360 to CPU 302 and clock signal 362 to PLL 31. Clock generator 306 further distributes clock signal 364 to AGP 330, PLL 312, and ICH 340. In one embaodiment, DRCG 308 receives clock signals from clock generator 306 and generates special memory clock 368 for RDRAMs 350. In this embodiment, clock signal 368, also known as a loop-back clock, is used to refresh RDRAM 350 when MCH 310 is shut down."

In one embodiment, clock generator 306 provides multiple clock signals with different clock frequencies. For example, clock signal 360 may have higher frequencies than clock signal 362. In another embodiment, a clock signal can be clocked at different frequencies. For example, clock signal 360 is clocking at a rate of 700 MHz during an active state or a high power consumption state and clock signal 360 can also be clocking at a rate of 400 MHz during a nap state or a low power consumption state.

In one embodiment, block diagram 300 implements C0, C1, C2, and C3 states as shown in FIG. 2 where C3 is also known as the deep-sleep state. In one embodiment, clock signals 360 and 362 are suspended or stopped during the C3 state. In an alternative embodiment, clock signal 360 is suspended while clock signal 362 continues to clock during the C3 state.

In one embodiment, CPU 302 receives clock signal 360 from clock synthesizer 304 and executes instructions in response to clock signal 360. In this embodiment, CPU 302 can be shut down when clock signal 360 stops clocking. For example, CPU 302 halts instruction execution when clock signal 360 stops clocking. Once CPU 302 is shut down or suspended, in one embodiment CPU 302 can subsequently resume the execution when clock signal 360 resumes clocking, which may have different clock frequencies than the clock frequencies before CPU 302 is suspended. Less power may be consumed when a processor such as CPU 302 runs at lower clock speed or frequency.

"In one embodiment, MCH 310 contains a host interface 316, PLL ("Phase Locked Loop") 312, AGP interface 320, PLL 314, a hub interface 318, a logic block 320, and a RMC 316. Host interface 316 is responsible for communication between MCH 310 and CPU 302. AGP interface 320 is responsible for communication between MCH 310 and AGP 330. Hub interface 318 is responsible for interface between MCH 310 and ICH 340, and RMC 316 is responsible for interface between MCH 310 and RDRAM 350."

In one embodiment, MCH 310 can be shut down during the C3 state when clock signal 362 is suspended. In this embodiment, hub interface 318 and AGP interface 320 are still active because they are clocked by the clock signals from PLL 314. Thus, if a substantial portion of MCH 310 is shut down, the interface between AGP and ICH is kept active for monitoring I/O commands. In one embodiment, RMC 316 further contains a phase aligner 318, which is used to synchronize the clock signal between the clock signal from PLL 312 and clock signal 368.

"In one embodiment, RDRAM 350 may contain multiple memory banks and can operate in four different states, namely, active state, standby state, nap state, and power down state. Active state consumes a large amount of power while power down state consumes the least amount of power. It should be appreciated that RDRAMs are high-performance memory devices and they can be replaced by similar high-performance DRAMs without altering the above-discussed functions. Furthermore, the RDRAM, in one embodiment, can be replaced by a high-performance SRAM. In one embodiment, AGP 330 can access RDRAM 350 without intervention of CPU 302 during active state or C0 state."

AGP 330 controls graphic implementations. ICH 340 controls I/O interfaces between processor units to external devices such as main memory, input device, and system buses. In another embodiment, ICH 340 controls multiple bus arbiters, which connect multiple external buses.

Figure 4:
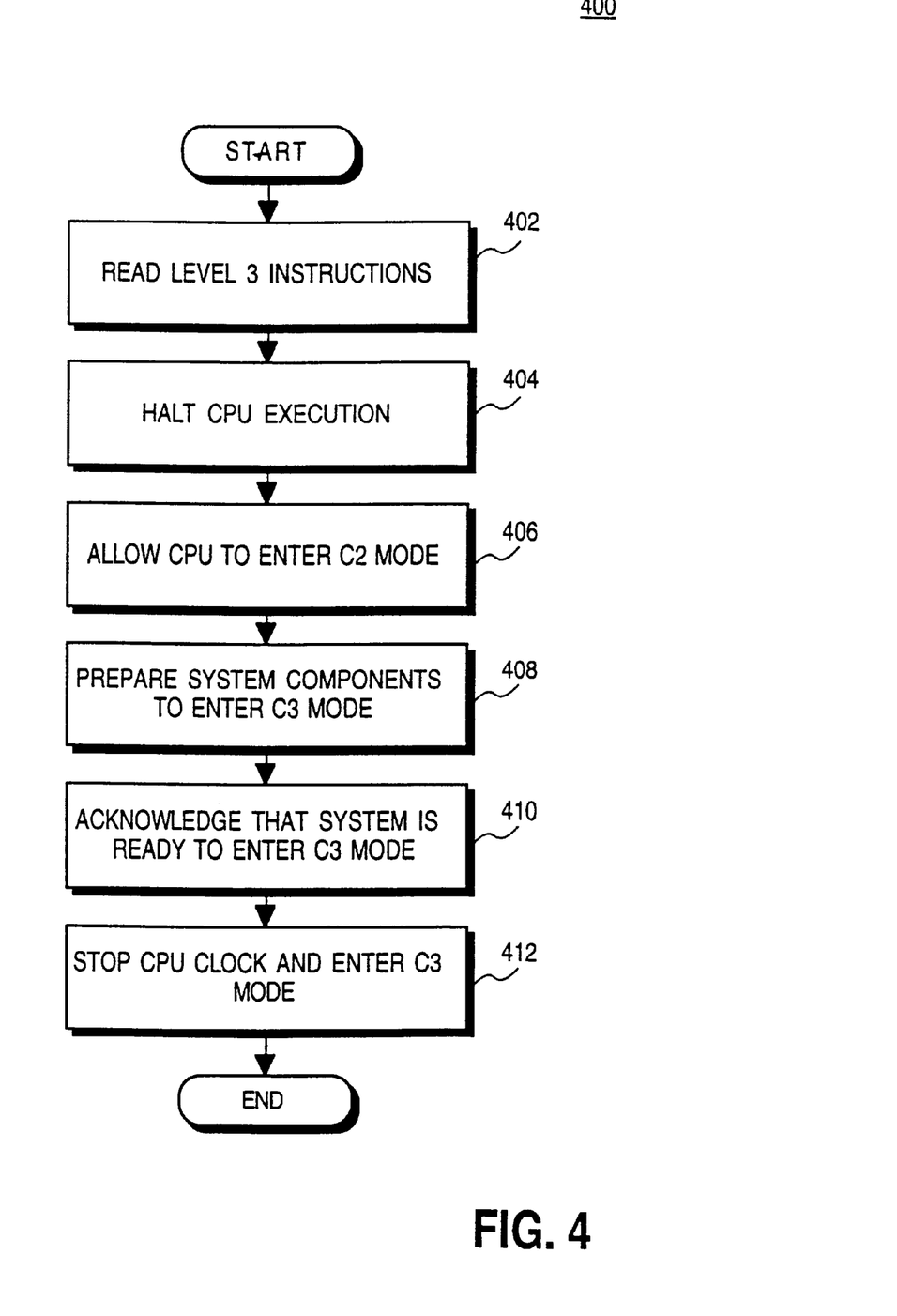
FIG. 4 is a flowchart illustrating one embodiment of a process for switching from a C0 mode to a C3 mode.

"FIG. 4 is a flowchart 400 illustrating one embodiment of a process for switching from a C0 mode to a C3 mode. A process begins at the start block and proceeds to block 402. At block 402, level three instructions are fetched and executed. After block 402, the process proceeds to block 404. At block 404, the process halts CPU executions. After block 404, the process proceeds to block 406 where the process allows CPU to enter C2 state. After block 406, the process proceeds to block 408. At block 408, the process prepares the system to enter C3 mode. The preparation for the system to enter C3 state includes disabling AGP arbiters, claiming internal queues, flushing buffers, performing temperature and current calibration, broadcasting power down message, and the like. After block 408, the process proceeds to block 410 where a signal of acknowledgement of C3 state is issued. After block 410, the process proceeds to block 412. At block 412, processor clock is suspended and the C3 state is entered. After block 412 the process ends."

Figure 5:
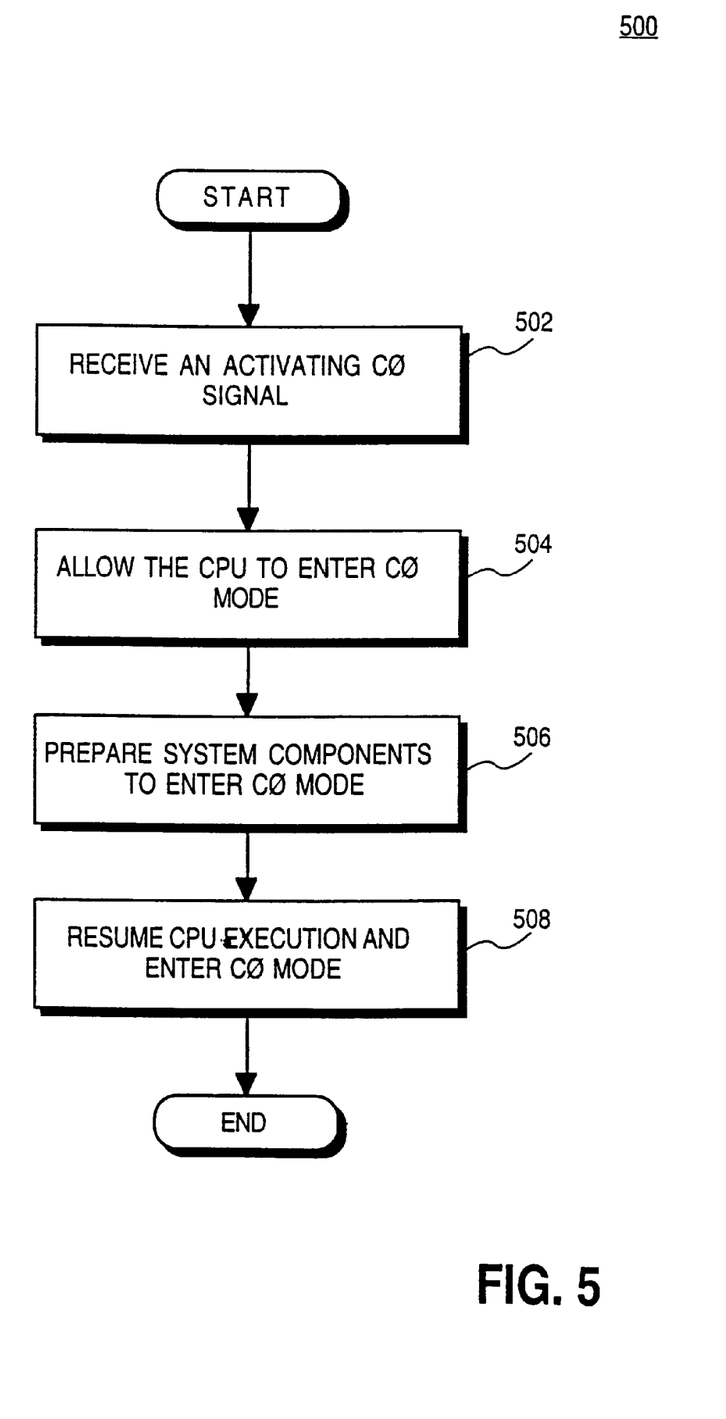
FIG. 5 is a flowchart illustrating one embodiment of a process for switching from a C3 state to a C0 state.

FIG. 5 is a flowchart 500 illustrating one embodiment of a process for switching from the C3 state to the C0 state. A process starts at the start block and proceeds to block 502. At block 502, the process receives an activating C0 signal. After block 502, the process proceeds to block 504 where the process allows the CPU to enter C0 state. After block 504, the process proceeds to block 506. At block 506, the process prepares the system to enter the C0 state. The preparation for a system to enter the C0 state includes but is not limited to informing RCG that the system is ready to enter the C0 state. Also, the state of RAC transits from an inactive state to an active state and the state of RDRAM transits from the power down state to the standby state or the nap state. Furthermore, MCH issues a temperature/current calibration and the memory should be refreshed. After AGP is enabled the process proceeds from block 506 to block 508. At block 508, the process enters the C0 state and resumes execution. After block 508, the process ends.

Figure 6:
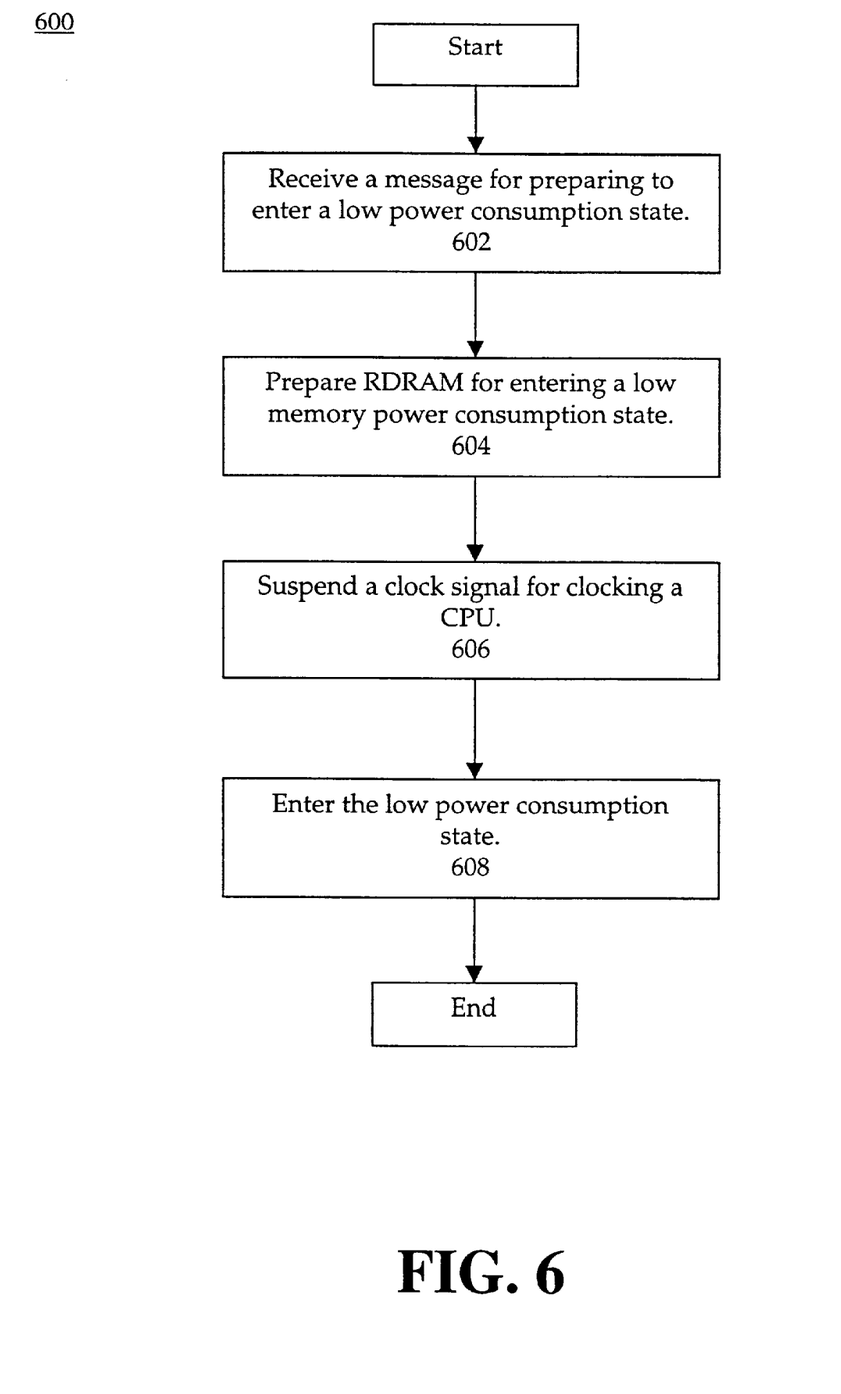
FIG. 6 is a flowchart illustrating one embodiment of a process for entering a low power consumption state.

FIG. 6 is a flowchart 600 illustrating one embodiment of a process for entering a low power consumption state. A process starts at block 602 where the process receives a message for preparing to enter a low power consumption state. After block 602, the process proceeds to block 604. At block 604, the process prepares RDRAM for entering a low-memory power consumption state. In one embodiment, a memory device such as RDRAM only performs a refresh function during the low-memory power consumption state. After block 604, the process proceeds to block 606. At block 606, the process suspends a clock signal for clocking a CPU. After block 606, the process moves to block 608. At block 608, the process enters the low power consumption state. After block 608, the process ends.

Figure 7:
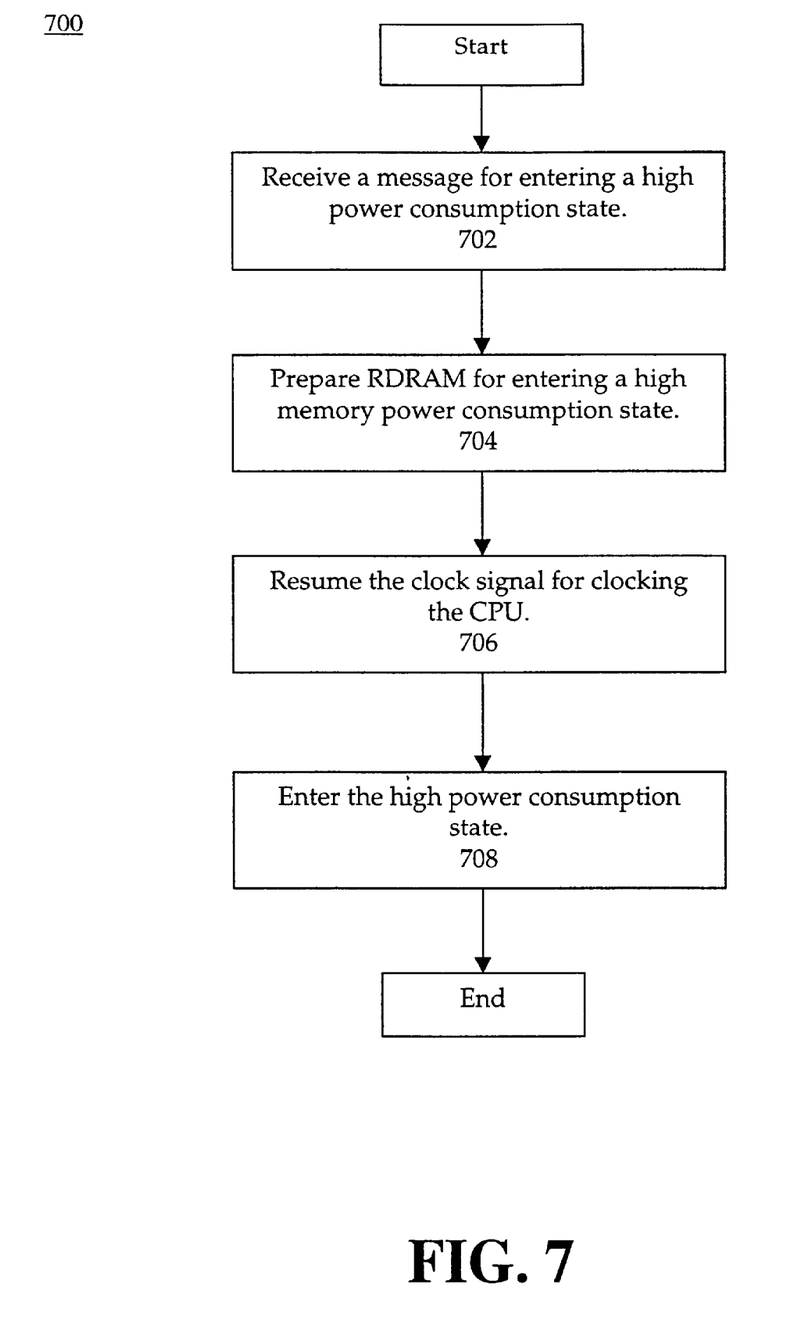
FIG. 7 is a flowchart illustrating one embodiment of a process of entering a high power consumption state.

FIG. 7 is a flowchart 700 illustrating one embodiment of a process of entering a high power consumption state. The process starts at block 702 where the process receives a message for entering to a higher power consumption state. After block 702, the process proceeds to block 704. At block 704, the process prepares RDRAM for entering a high-memory power consumption state. In one embodiment, a memory device performs full memory functions during the high-memory power consumption state. After block 704, the process proceeds to block 706. At block 706, the process resumes the clocking signal for clocking the CPU. After block 706, the process proceeds to block 708. At block 708, the process enters the high power consumption state. After block 708, the process ends.

Figure 8:
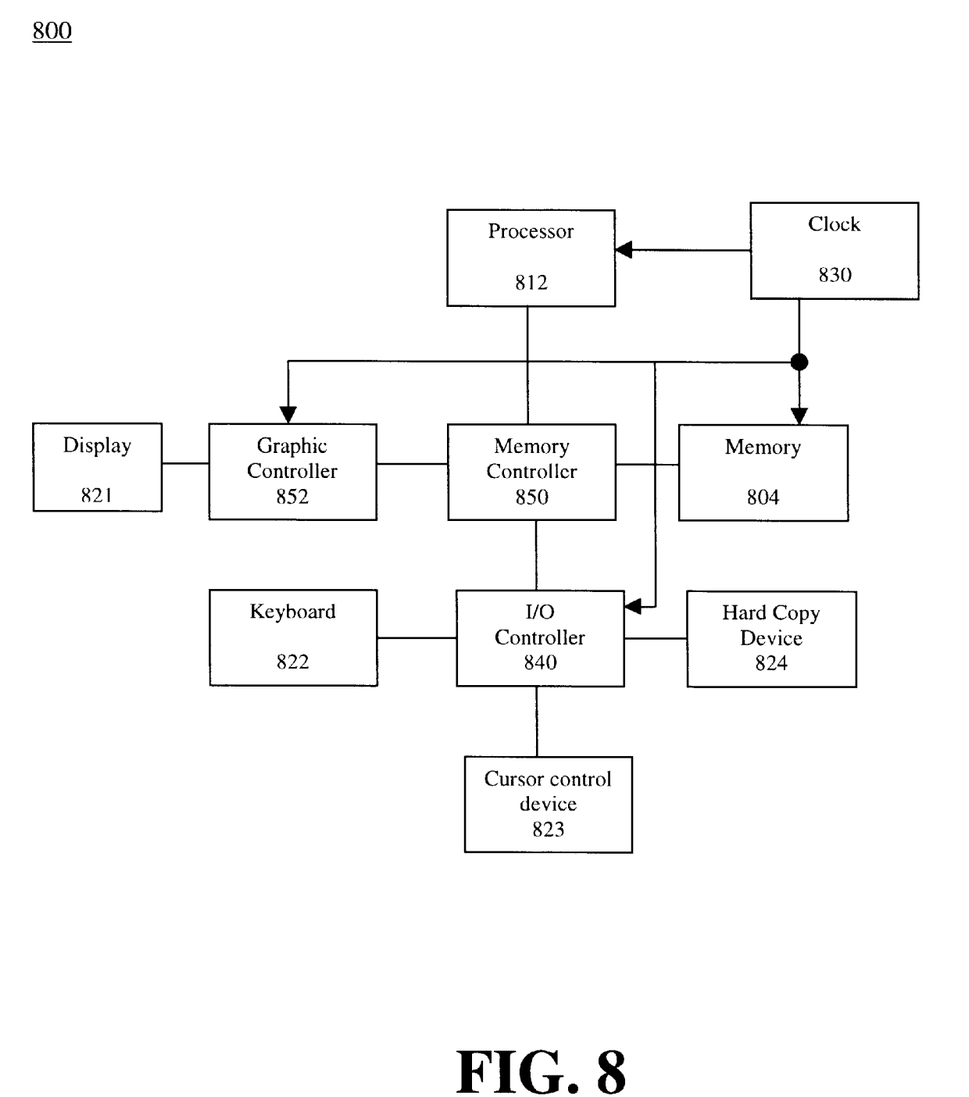
FIG. 8 illustrates one embodiment of a system in accordance with the teaching of the present invention.

FIG. 8 illustrates one embodiment of a system 800 in accordance with the teaching of the present invention. Computer system 800 includes a processor 812, a clock 830, a memory 804, a memory controller 850, a graphic controller 852, and an input and output ("I/O") controller 840. Graphic controller 852 is coupled to a display 821. I/O controller 840 is coupled to a keyboard 822, a hard copy device 824, and a cursor control device 823.

Processor 812 includes, but is not limited to, a microprocessor such as an Intel Architecture Microprocessor, manufactured by Intel Corporation of Santa Clara, Calif., the corporate assignee of the present invention. Processor 812 may also be another processor such as the PowerPC™, Alpha™, etc.

In one embodiment, memory controller 850 controls memory 804 and memory 804 may be a random access memory (RAM) or other dynamic storage device for storing information and instructions. Memory 804 also may be used for storing temporary variables or other intermediate information during execution of instructions by processor 812. Computer system 800 may also comprise a read only memory (ROM) and/or other static storage device for storing static information and instructions for processor 812.

Graphic controller 852 controls display 821, such as cathode ray tube (CRT) or liquid crystal display (LCD), for displaying information to a computer user. In one embodiment, I/O controller 840 is coupled to processor 812 via memory controller 850. I/O controller 840 controls input and output devices such as keyboard 822, cursor control device 823, and hard copy device 824. Cursor control 823 may be a mouse, trackball, trackpad, stylus, or cursor direction keys for communicating direction information and command selections to processor 812, and for controlling cursor movement on display 821.

Hard copy device 824 may be used for printing instructions, data, or other information on a medium such as paper, film, or similar types of media. Furthermore, a sound recording and playback device such as a speaker and/or microphone may optionally be coupled to I/O controller 840 for audio interfacing with computer system 800. Clock 830 is used to provide various clock signals to different components, such as processor 812, memory controller 850, etc.

In one embodiment, processor 812, graphic controller 852, and memory controller 850 may be integrated onto a single chip. In another embodiment, processor 812, graphic controller 852, I/O controller 840, and memory controller 850 may be integrated onto a single chip. Note that any or all of the components of system 800 and associated hardware may be used in the present invention. However, it can be appreciated that other configurations of the computer system may include some or all of the devices.

Figure 9:
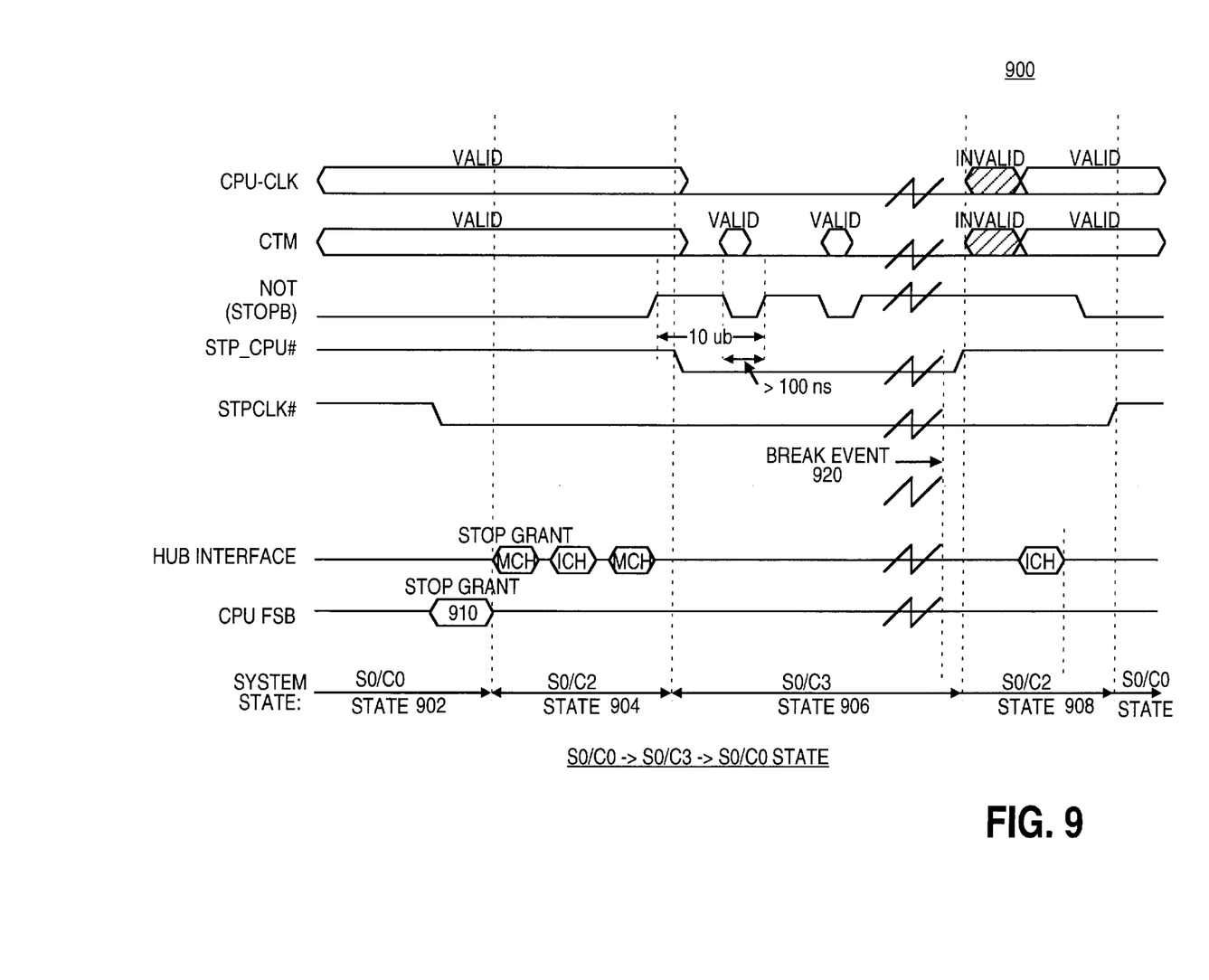
FIGS. 9, 10, and 11 are timing diagrams illustrating transition sequences performed by the present invention.

FIG. 9 is a timing diagram 900 illustrating transition sequences for performing a C0-C3-C0 state transition for conserving power consumption. At state 902, CPU disables arbiter in ICH and reads the level 3 register. In one embodiment, level 3 register contains information for initiating the transition. Next, the ICH asserts a stop clock ("STPCLK") signal to halt the CPU instruction stream. Upon asserting the STPCLK, CPU performs a stop grant cycle by issuing a stop grant signal ("Stop_Grant") 910 on CPU FSB.

MCH subsequently forwards stop_grant signal 910 to the ICH, which triggers the C2 state 904. ICH then returns a message to MCH indicating to prepare to go to C3 state 906. MCH disables the AGP arbiter, empties all internal queues and flushes buffers. Next, MCH issues self-refresh and current calibration commands to all the RDRAM banks. When MCH closes all pages and sets RDRAM to standby state, it broadcasts a power down command over a channel. In one embodiment, the RDRAM is in power down self-refresh mode. The transition from C2 state 904 to C3 state 906 takes place.

At C3 state 906, the RAC is placed in the nap mode where the RAC DLL refresh is performed. MCH subsequently sends an acknowledge message to ICH indicating to transit to C3 state 908. After ICH receives the acknowledge message, it asserts the STP_CPU signal for reducing CPU power. The transition from C2 state 904 to C3 state 906 takes place. During C3 state 906, MCH controls DRCG clock generator by asserting STOPB.

Figure 10:
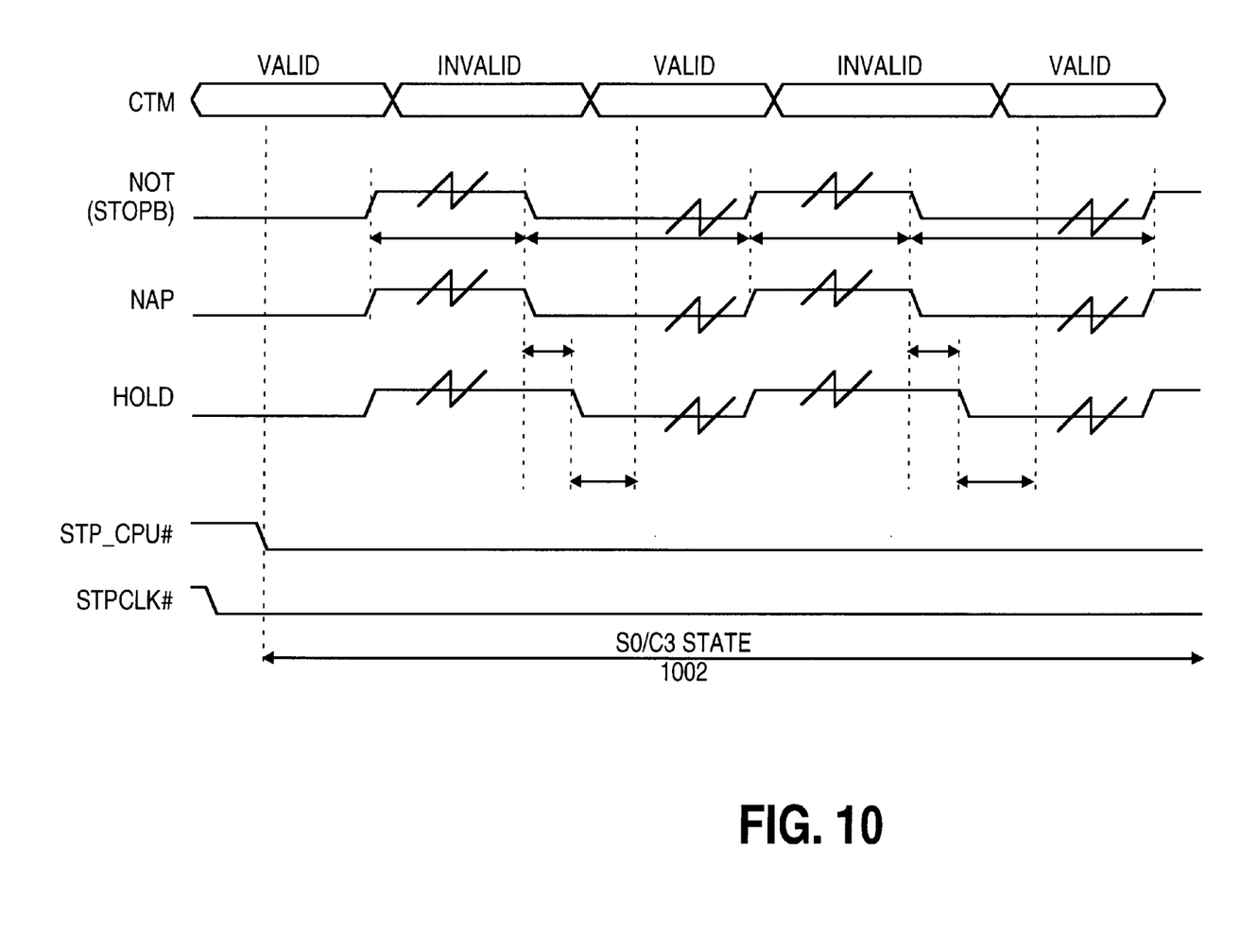

FIG. 10 is a timing diagram illustrating a transition from C3 to C0 state. When ICH detects the break event 920, it deasserts the STP_CPU signal. In one embodiment, the C3 state ends at a break event 920. The ICH sends a message to MCH requesting a transition to C0 state 1002. After the MCH deasserts STOPB signal to the DRCG, RAC will transit from the nap mode to the active mode. Once the DRCG phase is reacquired, RDRAM devices transit from power down state to standby or active state and then to nap state. Next, MCH issues temperature and current calibration and refreshes memory banks. After AGP arbiter is resumed, the ICH deasserts the STPCLK signal. The transition from C3 to C0 is accomplished.

Figure 11:
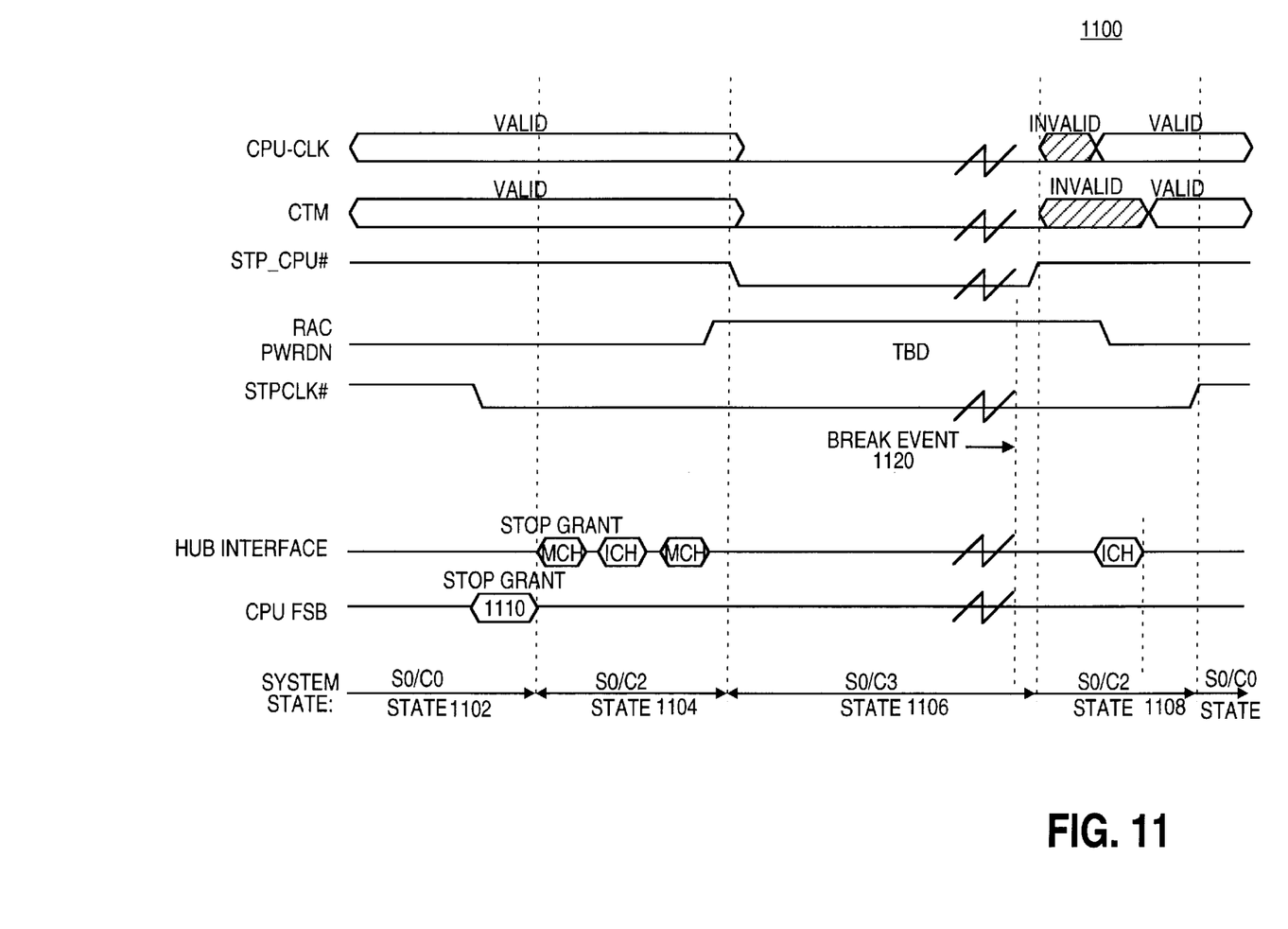

FIG. 11 is a timing diagram 1100 illustrating a transition between power consumption states for conversing power. After ICH detects a break event 1120, ICH deasserts the STP_CPU signal. In one embodiment, the STP_CPU signal does not toggle between active and inactive. Since the STP_CPU signal is connected to the STOPB pin of the DRCG, it causes DRCG to transit from stop clock mode to the normal mode. Next, ICH sends a message to MCH indicating to get ready to transit to C0 state.

After MCH receives the message, it informs RAC to transit from the power down state to active state. Once the temperature and current calibration are done, outputs of the phase aligner are not gated. Next, the clock and clock generator are aligned. RDRAM devices subsequently, are switched from the power down state to the standby/active state and then to the nap state. The MCH then issues memory refresh and calibration commands. When the AGP arbiter is resumed or enabled, the ICH deasserts the stop clock signal. The transition from C3 state to C0 state is accomplished.

In another embodiment, the transition from C0 to C3 state may begin with a step of disabling arbiter in ICH. After the CPU reads the level 3 register, which initiates the transition, ICH asserts the STPCLK signal to halt the CPU instruction stream. Upon asserting the STPCLK, CPU performs a stop grant cycle by issuing a stop_grant signal 1110 on CPU FSB.

MCH subsequently forwards the stop grant cycle to the ICH, which triggers the C2 state 1104. The ICH then signals MCH to go to C3 state 1106. MCH empties all internal queues and flushes buffers. MCH subsequently disables the AGP arbiter. When MCH closes all pages and sets RDRAM to standby state, it broadcast power down command over a channel. In one embodiment, the RDRAM is in power down self-refresh mode. Next, MCH gates the outputs of the phase aligner. The RAC transits from C2 state 1104 to C3 state 1106 or power down state.

After MCH signals to the ICH for switching to C3 state, the ICH asserts the STP_CPU signal, which causes to reduce CPU power consumption. In one embodiment, voltage conversion may be performed on the motherboard of the computer. In another embodiment, the STP_CPU signal is connected to the STOPB pin of the DRCG, which places the DRCG in stop clock mode.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

Thus, a method and a system for conserving power consumption using multiple power consumption states have been described.

What is claimed is:

1. A method comprising:

receiving a message to prepare a computer system to enter a low power consumption state from a higher power consumption state;

a CPU ("central processing unit") halting its instruction stream;

a MCH ("memory control hub") causing a DRCG ("Direct Rambus™ Clock Generator") to generate a special memory clock for the RDRAM; and the RDRAM entering a low-memory power consumption state.

2. The method of claim 1, wherein RDRAM only performs a refresh function during the low-memory power consumption state.

3. The method of claim 2, wherein the MCH additionally issues a self-refresh command to the RDRAM, and the refresh function is a self-refresh function performed by the RDRAM.

4. The method of claim 2, wherein the refresh function is performed by a loop-back clock when the MCH is shut down.

5. The method of claim 1, wherein the MCH additionally:

disables at least one AGP ("Advanced Graphics Processor") arbiter;

claims at least one internal queue;

flushes at least one buffer;

performs temperature and current calibration; and broadcasts a power down message.

6. The method of claim 1, wherein the low power consumption state comprises a C3 state in ACPI ("Advanced Configuration and Power Interface").

7. A method comprising:

receiving a message to prepare a computer system to enter a high power consumption state from a lower power consumption state;

a CPU ("central processing unit") resuming its instruction stream;

a MCH ("memory control hub") relinquishing control of a DRCG ("Direct Rambus™ Clock Generator") to halt a special memory clock for the RDRAM; and the RDRAM entering a high-memory power consumption state.

8. The method of claim 7, wherein RDRAM performs full memory functions during the high-memory power consumption state.

9. The method of claim 7, wherein the MCH ("Memory Control Hub") additionally:

issues a temperature/current calibration command; and refreshes memory banks of the RDRAM.

10. The method of claim 7, wherein the high power consumption state comprises a C0 state in ACPI ("Advanced Configuration and Power Interface").

11. A method comprising:

receiving a message to prepare a computer system to enter a low power consumption state from a higher power consumption state;

a CPU ("Central Processing Unit") disabling an ICH ("Input/Output Control Hub") arbiter and reading a level 3 register;

the ICH asserting a stop clock signal to halt the CPU instruction stream;

the CPU performing a stop grant cycle by issuing a stop grant signal to a MCH ("Memory Control Hub");

the MCH forwarding the stop grant signal to the ICH to trigger a C2 state;

the ICH returning a message to the MCH, the message indicating to prepare to go to a C3 state;

the MCH:

emptying internal queues;

flushing buffers;

disabling an AGP ("Advanced Graphics Processor") arbiter;

issuing a self-refresh command and a current calibration command to memory banks of a RDRAM ("Rambus™ Direct Random Access Memory");

setting the RDRAM to a standby state; and broadcasting a power down command over a channel;

the RDRAM entering a self-refresh and power down state;

a RAC ("Rambus™ ASIC cell") entering a nap mode to refresh a DLL ("Dynamic Link Library") of the RAC;

the MCH sending an acknowledge message to the ICH indicating to transition to the low power consumption state;

the ICH asserting a stop CPU signal to reduce CPU power; and the MCH asserting a STOPB signal to control a DRCG ("Direct Rambus™ Clock Generator"), the DRCG generating a special memory clock for the RDRAM.

12. The method of claim 11, wherein the level 3 register comprises information to initiate a transition from the higher power consumption state to the low power consumption state.

13. The method of claim 11, wherein the low power consumption state comprises a C3 state in ACPI ("Advanced Configuration and Power Interface").

14. The method of claim 13, wherein the higher power consumption state comprises a C0 state in ACPI.

15. The method of claim 11, wherein said ICH asserting a stop CPU signal to reduce CPU power comprises a motherboard of the computer system performing voltage conversion.

16. The method of claim 11, wherein the stop CPU signal is connected to a STOPB pin of the DRCG, and wherein said ICH asserting a stop CPU signal to reduce CPU power causes the STOPB pin to place the DRCG in stop clock mode.

17. A method comprising:
receiving a message to prepare a computer system to enter a high power consumption state from a lower power consumption state;
an ICH ("Input/Output Control Hub"):
deasserting a stop CPU signal;
sending a message to a MCH ("Memory Control Hub") to request transition to the high power consumption state;
the MCH deasserting a STOPB signal to relinquish control of a DRCG ("Direct Rambus™ Clock Generator");
a RAC ("Rambus™ ASIC cell") transitioning from a nap mode to an active mode;
a RDRAM ("Rambus™ Direct Random Access Memory") transitioning from a power down state to one of an active state and a standby state;
the MCH:
issuing temperature and current calibration commands;
refreshing memory banks of the RDRAM; and
resuming an AGP ("Advanced Graphics Processor") arbiter; and
the ICH deasserting a stop clock signal.

18. The method of claim 17, wherein the high power consumption state comprises a C0 state in ACPI ("Advanced Configuration and Power Interface").

19. The method of claim 18, wherein the lower power consumption state comprises a C3 state in ACPI.

20. The method of claim 17, wherein the stop CPU signal is connected to a STOPB pin of the DRCG, and wherein said ICH deasserting the stop CPU signal causes the DRCG to transition from stop clock mode to a normal mode.

21. A computer system comprising:
a clock synthesizer to:
provide a first clock signal to a CPU ("central processing unit") when the computer system is in an active state, and suspend the first clock signal when the computer system is in a clock stop state;
provide a second clock signal to a MCH ("memory control hub") when the computer system is in an active state, and suspend the second clock signal when the computer system is in a clock stop state; and
provide a third clock signal to a high-performance RAM ("random access memory") when the computer system is in an active state, and suspend the third clock signal when the computer system is in a clock stop state;
the CPU coupled to the clock synthesizer to operate in response to receiving the first clock signal, and to shut down when the first clock signal is not received;
the MCH coupled to the CPU and to the clock synthesizer to operate in response to receiving the second clock signal, and to shut down when the second clock signal is not received; and
the high-performance RAM coupled to the MCH and to the clock synthesizer to operate in response to receiving the third clock signal, and to shut down when the third clock signal is not received.

22. The system of claim 21, wherein the high-performance RAM comprises a RDRAM ("Rambus™ Direct Random Access Memory").

23. The system of claim 22, wherein the clock synthesizer provides the first clock signal to the RDRAM using:
a clock generator to provide the second clock signal to the CPU and the third clock signal to a PLL ("Phase Locked Loop"); and
a DRCG ("direct Rambus™ clock generator") to receive the first clock signal from the clock generator and to generate a special memory clock for the RDRAM.

24. The system of claim 23, additionally comprising:
an AGP ("advanced graphics processor") to control graphics implementations; and
an ICH ("input/output control hub") to control 110 interfaces between processor units to external devices.

25. The system of claim 24, wherein the MCH comprises:
a logic block to facilitate communication with the MCH;
a host interface communicatively coupled to the CPU and to the logic block to facilitate communication between the MCH and the CPU;
an AGP interface communicatively coupled to the AGP and to the logic block to facilitate communication between the MCH and the AGP;
a hub interface communicatively coupled to the ICH and to the logic block to facilitate communication between the MCH and the ICH;
a RMC/RAC ("Rambus™ memory control/Rambus™ ASIC cell") communicatively coupled to the RDRAM and to the logic block to facilitate communication between the MCH and the RDRAM;
a first PLL ("phase locked loop") communicatively coupled to the clock synthesizer to clock the host interface and the RMC/RAC using the second signal; and
a second PLL communicatively coupled to the clock synthesizer to clock the AGP interface and the hub interface using a fourth signal.

26. The system of claim 25, wherein ACPI ("Advanced Configuration and Power Interface") is used, and the first, second, and third clock signals are all provided in a C0 state, where the C0 state is an active power consumption state.

27. The system of claim 26, wherein the first and second clock signals are suspended, and the third clock signal is used to refresh the RDRAM in a C3 state, where the C3 state is a deep sleep state.

28. The system of claim 27, wherein the hub interface and the AGP interface are active because they are clocked by the fourth signal which is not suspended, the interfaces allowing the AGP and the ICH to monitor I/O ("input/output") commands.

29. The system of claim 26, wherein the first clock signal is suspended in a C3 state, and the third clock signal is used to refresh the RDRAM in a C3 state, where the C3 state is a deep sleep state.

* * * * *

UNITED STATES PATENT AND TRADEMARK OFFICE
CERTIFICATE OF CORRECTION

PATENT NO. : 6,633,987 B2
DATED : October 14, 2003
INVENTOR(S) : Jain et al.

It is certified that error appears in the above-identified patent and that said Letters Patent is hereby corrected as shown below:

Column 5,
Line 5, delete "embaodiment" and insert -- embodiment --.

Column 12,
Line 17, delete "110" and insert -- I/O --.

Signed and Sealed this

Thirteenth Day of January, 2004

JON W. DUDAS
*Acting Director of the United States Patent and Trademark Office*